United States Patent [19]

Igarashi et al.

[11] Patent Number: 4,520,075

[45] Date of Patent: May 28, 1985

[54] SILOXANE-MODIFIED POLYIMIDE PRECURSOR AND POLYIMIDE

[75] Inventors: Kazumasa Igarashi; Katsuhiko Yamaguchi; Kazuo Iko; Kazuyuki Miki, all of Osaka, Japan

[73] Assignee: Nitto Electric Industrial Co., Ltd., Osaka, Japan

[21] Appl. No.: 654,517

[22] Filed: Sep. 25, 1984

Related U.S. Application Data

[63] Continuation of Ser. No. 528,927, Sep. 2, 1983, abandoned.

[51] Int. Cl.$^3$ .............................................. C08G 73/10
[52] U.S. Cl. .................................... 428/435; 428/446; 428/447; 428/473.5; 428/474.4; 528/26; 528/125; 528/128; 528/172; 188/352; 188/353
[58] Field of Search .................. 528/26, 125, 128, 172, 528/188, 352, 353; 428/435, 446, 447, 473.5, 474.4

[56] References Cited

U.S. PATENT DOCUMENTS

| | | | |
|---|---|---|---|
| 3,740,305 | 6/1973 | Hoback et al. | 528/26 |
| 4,051,163 | 9/1977 | Berger | 528/26 |
| 4,338,426 | 7/1982 | Sato et al. | 528/26 |

FOREIGN PATENT DOCUMENTS 2101149  1/1983  United Kingdom .................. 528/26

Primary Examiner—Lester L. Lee
Attorney, Agent, or Firm—Sughrue, Mion, Zinn, Macpeak, and Seas

[57] ABSTRACT

A siloxane-modified polyimide precursor which can be converted into a polyimide having excellent adhesion and moisture resistance is produced by simultaneously polymerizing a diaminosiloxane and a diamine containing no silicon atoms in its molecule with 3,3',4,4'-biphenyltetracarboxylic dianhydride, wherein the diaminosiloxane is used in an amount of 1 to 4 mole % per mole of the total diamino compounds and such that the silicon content in the final reaction product is 0.5 wt % or less. The thus obtained precursor solution is further heat aged to reduce the molecular weight of the precursor so that solution viscosity is decreased to a proper level suitable for coating operation.

28 Claims, No Drawings

SILOXANE-MODIFIED POLYIMIDE PRECURSOR AND POLYIMIDE

This is a continuation-in-part, of application Ser. No. 528,927, filed 09/02/83 and now abandoned.

FIELD OF THE INVENTION

The present invention relates to a process for producing a siloxane-modified polyimide precursor by polymerizing 3,3',4,4'-biphenyltetracarboxylic dianhydride with a diamino compound, a part of which is diaminosiloxane.

BACKGROUND OF THE INVENTION

Heretofore, studies have been made on the application of heat-resistant polymers such as polyimide, polyamide or polyhydantoin as the organic passivation film, surface protecting film, interlayer insulating film, etc., of semiconductor elements, on account of their superior heat resistance, electrical insulation, and mechanical strength. Unfortunately, these heat-resistant polymer films have poor adhesion to the surface of an element such as silicon wafer or glass. Those films do not stabilize the surface of element and rather decrease the reliability of semiconductor elements.

Several methods have been proposed to improve the adhesion of the above heat-resistant polymer films. One of them is concerned with a polyimide. According to this method, a polyimide precursor for polyimide is produced by polymerizing an aromatic tetracarboxylic dianhydride and diaminosiloxane in place of a diamino compound. The polyimide produced according to this method has in its molecular skeleton the Si-O-Si linkage derived from the diaminosiloxane. Owing to this linkage which bonds to silicon atoms in silicon wafer or glass, the resulting polyimide film is improved in adhesion to a silicon-containing material.

The polyimide film produced according to the above method is improved in adhesion but is poor in moisture resistance when used as a passivation film, because the diaminosiloxane accounts for most or all of the diamino compound. Moreover, the excessive diaminosiloxane is not preferable for the inherent properties of polyimide such as heat resistance, electrical insulating properties, and mechanical strength.

There is also proposed a method for producing a polyimide from a mixture of polyimide precursors, one being synthesized with an excess amount of diaminosiloxane and the other being synthesized with a diamine containing no silicon atom in its molecule. The polyimide produced according to this method has the same disadvantage as mentioned above because the mixture contains a large amount of silicon. Moreover, the polyimide produced from a mixture varies its adhesion, moisture resistance, and other properties between the lots.

SUMMARY OF THE INVENTION

Various investigations have been made to develop a siloxane-modified polyimide precursor which can provide a polyimide having an excellent adhesion to substrates and moisture resistance as well as its inherent heat resistance, electrical insulating properties (such as volume resistivity), and mechanical strength (such as film strength).

Accordingly, an object of this invention is to provide a process for producing a siloxane-modified polyimide precursor which can be converted into a polyimide having excellent adhesion and moisture resistance, which comprises simultaneously polymerizing a diaminosiloxane represented by the formula

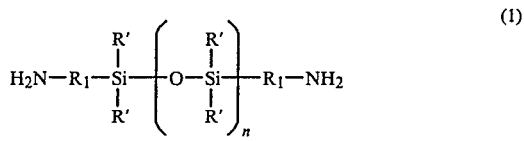

wherein $R_1$ which may be the same or different is a divalent organic group, $R'$ which may be the same or different is a monovalent organic group, and n is an integer of 1 to 1,000, and a diamine containing no silicon atoms in its molecule with 3,3',4,4'-biphenyltetracarboxylic dianhydride, wherein the diaminosiloxane is used in an amount of 1 to 4 mole% per mole of the total diamino compounds and such that the silicon content in the final reactant product is 0.5 wt% or less.

Another object of this invention is to provide a process for producing a siloxane-modified polyimide precursor which can be converted into a polyimide having an excellent adhesion and moisture resistance, which comprises additionally heat aging the solution of the precursor obtained in the above process at 40° to 80° C. to decrease the inherent viscosity of the solution.

DETAILED DESCRIPTION OF THE INVENTION

The amount of the diaminosiloxane which is used to improve the adhesion of polyimide is 1 to 4 mole% per mole of the total diamino compounds and also such that the silicon content in the final reaction product is 0.5 wt% or less. By using the diaminosiloxane in such an amount, the content of the siloxane linkage portion in the polyimide precursor, which tends to be cut by a thermal decomposition under moisture, an acid or an alkali, is greatly reduced. Therefore, the moisture resistance of the polyimide is not deteriorated and the inherent heat resistance, electrical insulating property (e.g., volume resistivity) and mechanical strength (e.g., film strength) of the polyimide can be maintained.

The diaminosiloxane represented by the formula (I) used in the present invention includes various conventional diaminosiloxanes. Specific examples of the diaminosiloxane are:

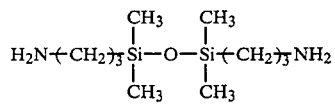

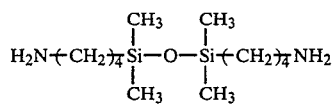

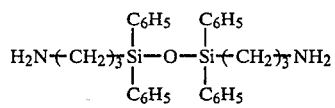

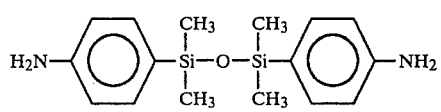

-continued

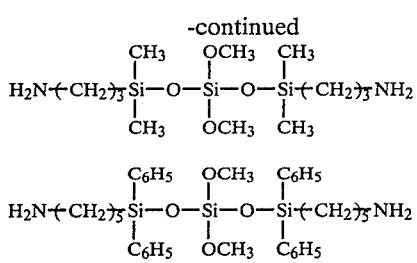

The diamine containing no silicon atoms in its molecule (hereinafter referred to as "a silicon-free diamine") used in the process of this invention includes aromatic diamines, aliphatic diamines, and alicyclic diamines represented by the formula $$H_2N—R_2—NH_2 \quad (2)$$

wherein $R_2$ is a divalent organic group containing no silicon atoms, and $R_2$ may be the same as $R_1$ or different from $R_1$ in the above formula (1). Of those diamines, aromatic diamines are preferred.

Examples of the diamines include m-phenylenediamine, p-phenylenediamine, 4,4'-diaminodiphenylmethane, 4,4'-diaminodiphenylether, 2,2'-bis(4-aminophenyl)propane, 3,3'-diaminodiphenylsulfone, 4,4'-diaminodiphenylsulfone, 4,4'-diaminodiphenylsulfide, benzidine, benzidine-3,3'-dicarboxylic acid, benzidine-3,3'-disulfonic acid, benzidine-3-monocarboxylic acid, benzidine-3-monosulfonic acid, 3,3'-dimethoxybenzidine, p-bis(4-aminophenoxy)benzene, m-bis(4-aminophenoxy)benzene, m-xylylene diamine, and p-xylylene diamine.

According to the process of this invention, 3,3',4,4'-biphenyltetracarboxylic dianhydride (hereinafter referred to as "BPDA") is used as the aromatic tetracarboxylic dianhydride for the reasons that the resulting polyimide has not only excellent adhesion and moisture resistance but also excellent electrical insulating properties (e.g., volume resistivity) and mechanical strength (e.g., film strength). Moreover, BPDA provides a polyimide having the most excellent electrical properties under the high temperature and high humidity atmosphere, for example, under the pressure cooker test (hereinafter referred to as "PCT") at 121° C. under 2 atms, i.e., extremely excellent moisture resistance. Thus, such a polyimide film can greatly improve the performances as the passivation film.

According to the process of this invention the diaminosiloxane and silicon-free diamine must be simultaneously polymerized with the aromatic tetracarboxylic dianhydride. If the two amino compounds are polymerized separately and the products are mixed later, the resulting polyimide shows unevenness of adhesion and moisture resistance and does not have a constant and stable quality.

The diaminosiloxane must be used in an amount of 1 to 4 mole%, preferably 3 to 3.5 mole%, per mole of the total diamino compounds and such that the content of silicon atoms in the resulting polyimide precursor is 0.5 wt% or less. Otherwise, the polyimide obtained from the polyimide precursor does not have all the adhesion, moisture resistance, electrical insulating properties (e.g., volume resistivity), and mechanical strength (e.g., film strength).

The diamino compounds comprising diaminosiloxane and silicon-free diamine is usually polymerized with an equimolar amount of BPDA. However, the proportion thereof may be slightly varied, if desired and necessary.

The polymerization reaction can be carried out according to the conventional process. Usually, the reaction is conducted in an organic solvent under a nitrogen gas stream until the degree of polymerization reaches a desired value. The reaction temperature should be kept 60° C. or less, preferably 40° C. or less, and more preferably 30° C. or less taking into consideration the heat of polymerization. The degree of polymerization can be easily detected by measuring the inherent viscosity ($\eta$) of the reaction product. The reaction is generally completed within the inherent viscosity range of 1.3 to 3.0. If the reaction is completed below the range, the polyimide having excellent heat resistance and other properties cannot be obtained.

The inherent viscosity ($\eta$) is employed as the parameter showing the degree of polymerization (molecular weight) of the polyimide precursor and is calculated at $30 \pm 0.01°$ C. (in a constant temperature bath) using N-methyl-2-pyrrolidone as the solvent according to the following equation.

$$(\eta) = 1 n(t/t_o)/C$$

wherein
t: falling time of the polymer solution measured in Ubbellohde viscometer,
$t_o$: falling time of the solvent measured in Ubbellohde viscometer, and
C: concentration (0.05 wt%) of polyimide precursor (polymer).

The polyimide used as the organic passivation film for semiconductor elements must be free of ionic impurities such as cationic impurities (e.g., $Na^+$, $K^+$ or $Ca^{++}$) and anionic impurities (e.g., $(Cl^-)$. $Na^+$ ion is particularly deleterious to the electrical properties of the polyimide protecting film or insulating film. Therefore, the starting monomer and solvent used for polymerization must be thoroughly purified before use. The concentration of $Na^+$ should be lower than 5 ppm, preferably lower than 1 ppm.

The organic solvent used in the process of this invention is a high polar basic solvent such as N-methyl-2-pyrrolidone, N,N'-dimethylacetamide, N,N'-dimethylformamide, N,N'-dimethylsulfoxide, and hexamethylphosphoramide. These solvents are highly hygroscopic and the absorbed water causes deterioration of the molecular weight during polymerization and deterioration of the storage stability. Therefore, those must be thoroughly dehydrated with a dehydrating agent prior to use. These solvents may be used in combination with a commercially available solvent such as toluene, xylene, benzonitrile, benzene, and phenol. The amount of the solvent must be the range such that the solubility of the resulting polyimide precursor is not decreased. According to the process of this invention, the concentration of the reactants charged is 15 to 40 wt%.

The polyimide precursor produced according to the process of this invention has a structure as shown in the formula (4)

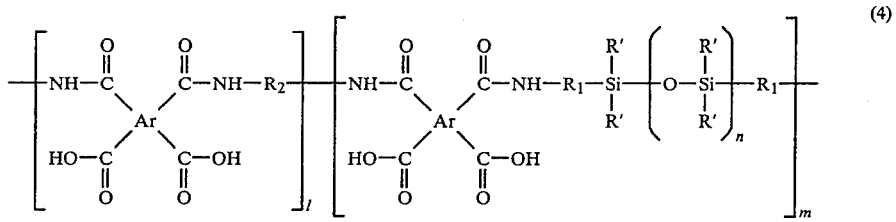

wherein $R_1$, $R_2$, $R'$ and n are the same as defined above; Ar is a tetravalent organic group; and l and m are positive integers with proviso that $m/l+m=0.01$ to 0.04. The polyimide precursor is made up of two structural units. In one unit, the silicon-free diamine is added to the aromatic tetracarboxylic dianhydride through the amide linkage, and in the other unit, the diaminosiloxane is added to the aromatic tetracarboxylic dianhydride through the amide linkage. These structural units are randomly arranged. It is noted that the siloxane linkage is slightly present in the molecular chain of the polyimide precursor.

The polyimide precursor can be converted into a polyimide represented by the formula (5) below when it is applied to a substrate and heated at a high temperature for dehydration and cyclization. This polyimide has an excellent adhesion to silicon wafers and glass. Also, the inherent excellent moisture resistance, heat resistance, chemical resistance, mechanical resistance, and electrical insulating properties of the polyimide can be maintained.

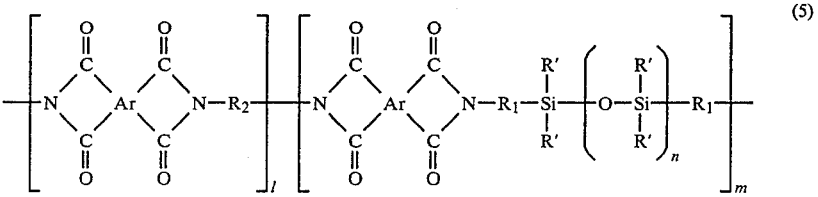

wherein $R_1$, $R_2$, $R'$, Ar, n, l, and m are the same as defined above.

The polyimide precursor obtained according to the process of this invention is useful to form a passivation film on the surface of semiconductor elements. Moreover, such can be used as a protecting film for diode junction.

The siloxane-modified polyimide precursor is desired to be a polymer having a high inherent viscosity in view of the heat resistance and other properties. In this case, a problem arises such that the solution viscosity increases and a practical solid concentration cannot be obtained. For example, the concentration of reactants charged for the synthesis of polyimide precursor is usually 5 to 15 wt% from the economical reasons. The resulting polyimide precursor produced from the starting materials even in such low concentrations must be further diluted to a considerable extent after polymerization in order to obtain a proper solution viscosity suitable for spin coat, dipping, or brushing. This dilution often results in lot-to-lot variation of solution viscosity and makes the coating operation complicated. In addition, the extremely low solid concentration causes dewetting and thickness variation in the coating, and the resulting polyimide film is adversely affected.

In order to overcome this disadvantage, the present invention also provides a process for producing a siloxane-modified polyimide precursor which can be converted into a polyimide having excellent adhesion and moisture resistance, which comprises simultaneously polymerizing a diaminosiloxane represented by the formula

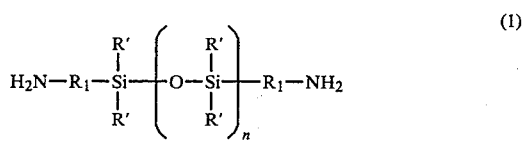

wherein $R_1$, $R'$ and n are the same as defined above, and a diamine containing no silicon atoms in its molecule with 3,3',4,4'-biphenyltetracarboxylic dianhydride in an inert solvent, wherein diaminosiloxane is used in an amount of 1 to 4 mole% per mole of the total diamino compounds, to obtain a solution of a siloxane-modified polyimide precursor having the silicon content of 0.5 wt% or less, and heat aging the resulting solution at 40° to 80° C. to reduce the inherent viscosity of the precursor.

By heat aging the solution of the polyimide precursor at a specific temperature, the inherent viscosity of the precursor decreases due to cleavage or rearrangement of molecules. This heat aging makes it unnecessary to dilute the precursor to achieve a proper solution viscosity for coating. Moreover, the heat aging step does not adversely affect the excellent adhesion, moisture resistance, heat resistance, mechanical strength (e.g., film strength) and electrical insulating property (e.g., volume resistance) of the polyimide film formed from a solution of low viscosity and high concentration.

The heat aging is conducted by heating the solution of the precursor at 40° to 80° C., preferably 50° to 60° C., in the same reactor under a nitrogen gas stream. The heat aging causes cleavage and rearrangement of molecules in the polymeric siloxane-modified polyimide precursor having a high degree of polymerization to form the low molecular weight precursor.

The degree of formation of the low molecular weight precursor is such that the inherent viscosity decreases to 0.3 to 0.7, although varying depending on the relation between the solution viscosity and the properties of polyimide. For example, the solution viscosity is 1,000 to 20,000 centipoises when the concentration is 25 wt%.

If the inherent viscosity is too low, the film forming ability becomes poor and also insulating properties, heat resistance and other properties when applied to semiconductors deteriorate.

If the heat aging temperature exceeds 80° C., particularly 100° C., cross-linking reaction takes place, causing gelation. If the heat aging temperature is lower than 40° C., the effect of aging is not sufficient and the aging time is long.

The siloxane-modified polyimide precursor obtained after aging has a low degree of polymerization but is made up of randomly arranged two structural units; one consisting of a silicon-free diamine and an aromatic tetracarboxylic dianhydride connected through the amide linkage, and the other consisting of a diaminosiloxane and an aromatic tetracarboxylic dianhydride connected through the amide linkage. The molecule of the polyimide precursor has a small number of siloxane linkages.

The siloxane-modified polyimide precursor prepared as mentioned above has a low solution viscosity which is suitable for spin coating, dipping, or brushing. Therefore, dilution is not required after the aging step, even when the reactants are charged at concentrations of 20 to 25 wt%. After application to silicon wafers and other substrates, the siloxane-modified polyimide precursor is heated at a high temperature for dehydration and cyclization. As the result, a polyimide represented by the formula (5) above is formed. This polyimide has very good adhesion to silicon wafers and glass and maintains the inherent moisture resistance, heat resistance, chemical resistance, mechanical properties, and electrical insulating properties.

Thus, the siloxane-modified polyimide precursor prepared according to the processes of the present invention can be widely applied to the conventional various uses such as the surface protecting film and interlayer insulating film of semiconductor elements, the protecting film of diode junction, and the like.

The invention will be described in more detail by reference to the following examples.

EXAMPLE 1

Into a 500 ml flask equipped with a stirrer, cooling tube, thermometer, and nitrogen inlet, and placed on a water bath, were charged 280.90 g of N-methyl-2-pyrrolidone which had been dried overnight with phosphorus pentoxide and purified by vacuum distillation. Nitrogen was introduced into the flask. Using a 1 ml microsyringe, 0.87 g (0.0035 mole) of bis(3-aminopropyl)-tetramethyldisiloxane $H_2N-(CH_2)_3Si-(CH_3)_2O-Si-(CH_3)_2(CH_2)_3NH_2$ was charged and then 19.3 g (0.0965 mole) of 4,4'-diaminodiphenylether was charged, with stirring. 29.4 g (0.1 mole) of 3,3',4,4'-biphenyltetracarboxylic dianhydride was added slowly. The reactants were stirred while keeping the temperature of the system 30° C. or less, until a transparent viscous solution was obtained.

A polyimide precursor thus obtained had the inherent viscosity of 1.67 and the silicon content of 0.397 wt%. The solution containing this precursor was applied by spin coating onto a silicon wafer, followed by air drying at 150° C. for 1 hour, at 200° C. for 1 hour, and at 250° C. for 6 hours, to convert into a polyimide.

The polyimide film thus formed was examined by infrared absorption spectrometry. Absorption of >C=O based on the imide group was observed at 1,780 cm$^{-1}$ and 1,720 cm$^{-1}$.

The polyimide film formed was tough and had a good adhesion to the silicon wafer. The film did not peel off even after PCT treatment.

EXAMPLE 2

A 15 wt% solution of polyimide precursor was prepared in the same manner as in Example 1 except that 281.46 g of purified N,N'-dimethylacetamide was used as a solvent and 0.97 g (0.0035 mole) of bis(4-aminobutyl)-tetramethyldisiloxane was used as a diaminosiloxane.

The polyimide precursor thus obtained had an inherent viscosity of 1.81 and contained 0.396 wt% of silicon.

This polyimide precursor solution was applied to a silicon wafer under the same conditions as in Example 1 to form a polyimide film. The resulting film was tough and had a good adhesion as in Example 1.

COMPARATIVE EXAMPLE 1

A 15 wt% solution of polyimide precursor was prepared in the same manner as in Example 1 except that 237.83 g of purified N-methyl-2-pyrrolidone was used and 21.8 g (0.1 mole) of pyromellitic dianhydride was used as an aromatic tetracarboxylic dianhydride.

The polyimide precursor thus obtained had an inherent viscosity of 1.65 and contained 0.469 wt% of silicon.

This polyimide precursor solution was applied to a silicon wafer under the same conditions as in Example 1. The coating was heated with an air drier at 150° C. for 1 hour, at 200° C. for 1 hour, and at 300° C. for 1 hour to form a polyimide film. The resulting polyimide film was tough and had good adhesion. The film did not peel off from the silicon wafer even after PCT treatment.

COMPARATIVE EXAMPLE 2

A 15 wt% solution of polyimide precursor was prepared in the same manner as in Example 1 except that 295.67 g of purified N-methyl-2-pyrrolidone was used, 32.2 g (0.1 mole) of 3,3',4,4'-benzophenonetetracarboxylic dianhydride was used as an aromatic tetracarboxylic dianhydride, and 19.107 g (0.0965 mole) of 4,4'-diaminodiphenylmethane was used as a silicon-free diamine.

The polyimide precursor thus obtained had an inherent viscosity of 1.38 and contained 0.377 wt% of silicon.

This polyimide precursor solution was applied to a silicon wafer under the same conditions as in Example 1. The resulting polyimide film had good adhesin as in Example 1, but decreased its tensile strength to 40% after 6 months. Nevertheless, the film was tough so as to be sufficiently used as the passivation film.

COMPARATIVE EXAMPLE 3

A 15 wt% solution of polyimide precursor was prepared in the same manner as in Example 1 except that 259.36 g of purified N-methyl-2-pyrrolidone was used, and 14.7 g (0.05 mole) of 3,3',4,4'-biphenyltetracarboxylic dianhydride and 10.9 g (0.05 mole) of pyromellitic dianhydride were used as the aromatic tetracarboxylic dianhydride.

The polyimide precursor thus obtained had an inherent viscosity of 1.52 and contained 0.430 wt% of silicon.

This polyimide precursor solution was applied to a silicon wafer under the same conditions as in Comparative Example 1. The resulting polyimide film was tough and had good adhesion as in Example 1.

COMPARATIVE EXAMPLE 4

A 15 wt% solution of polyimide precursor was prepared in the same manner as in Example 1 except that 280.07 g of purified N-methyl-2-pyrrolidone, 19.9 g (0.0995 mole) of 4,4'-diaminodiphenylether, and 0.1243 g (0.0005 mole) of bis(3-aminopropyl)tetramethyldisiloxane were used.

The polyimide precursor thus obtained had an inherent viscosity of 2.37 and contained 0.057 wt% of silicon.

This polyimide precursor solution was applied to a silicon wafer under the same conditions as in Example 1. The resulting polyimide film did not peel off from the silicon wafer under the normal conditions, but peeled off easily after PCT treatment.

COMPARATIVE EXAMPLE 5

A 15 wt% solution of polyimide precursor was prepared in the same manner as in Example 1 except that 281.86 g of purified N-methyl-2-pyrrolidone, 18.6 g (0.093 mole) of 4,4'-diaminodiphenylether, and 1.7395 g (0.007 mole) of bis(3-aminopropyl)tetramethyldisiloxane were used.

The polyimide precursor thus obtained had an inherent viscosity of 0.80 and contained 0.791 wt% of silicon. Further, the polyimide precursor had a molecular weight lower than that obtained in Example 1.

This polyimide precursor solution was applied to a silicon wafer under the same conditions as in Example 1. The resulting polyimide film was tough and had good adhesion as in Example 1.

those polyimide precursors contained 0.469 wt% of silicon.

This polyimide precursor solution was applied to a silicon wafer under the same conditions as in Comparative Example 1. The resulting polyimide film had poor adhesion to silicon wafer as compared with that obtained in Comparative Example 3. Moreover, the polyimide film was not uniform in quality, and in some case peeled off after PCT treatment.

COMPARATIVE EXAMPLE 7

A 15 wt% solution of polyimide precursor was prepared in the same manner as in Example 1 except that 187.52 g of purified N-methyl-2-pyrrolidone, 21.8 g (0.1 mole) of pyromellitic dianhydride as an aromatic tetracarboxylic dianhydride, 10.42 g (0.0965 mole) of p-phenylenediamine as a silicon-free diamine, and 0.87 g (0.0035 mole) of bis(3-aminopropyl)tetramethyldisiloxane as a diaminosiloxane were used.

The polyimide precursor thus obtained had an inherent viscosity of 1.58 and contained 0.594 wt% of silicon.

This polyimide precursor solution was applied to a silicon wafer under the same conditions as in Example 1. The resulting polyimide film had good adhesion as in Example 1.

The polyimide films obtained in Examples 1 and 2 and Comparative Examples 1 to 7 were tested for adhesion and electrical insulating properties under the same environment. The results are shown in the following table. The thickness of the polyimide films tested was 50±5 µm.

| | Adhesion to Silicon Wafer | | Volume Resistivity 500 V (ohm · cm) | | Breakdown Voltage (kv/mm) | Film Strength (residual tensile strength) (%) |
|---|---|---|---|---|---|---|
| | Normal Condition | PCT × 24 Hours | Normal Condition | PCT × 24 Hours | | |
| Example 1 | Good | Good | $2.2 \times 10^{16}$ | $4.0 \times 10^{16}$ | 135 | 91 |
| Example 2 | Good | Good | $2.1 \times 10^{16}$ | $2.7 \times 10^{16}$ | 140 | 90 |
| Comparative Example 1 | Good | Good | $3.0 \times 10^{16}$ | $1.0 \times 10^{15}$ | 125 | 72 |
| Comparative Example 2 | Good | Good | $2.1 \times 10^{16}$ | $3.4 \times 10^{15}$ | 135 | 35 |
| Comparative Example 3 | Good | Good | $3.1 \times 10^{16}$ | $6.7 \times 10^{15}$ | 133 | 78 |
| Comparative Example 4 | Poor | Peel | $2.0 \times 10^{16}$ | $5.6 \times 10^{15}$ | 140 | 95 |
| Comparative Example 5 | Good | Good | $1.7 \times 10^{16}$ | $5.5 \times 10^{14}$ | 105 | 89 |
| Comparative Example 6 | Poor | Peel | $2.6 \times 10^{16}$ | $7.5 \times 10^{14}$ | 123 | 73 |
| Comparative Example 7 | Good | Good | $1.7 \times 10^{16}$ | $1.0 \times 10^{13}$ | 103 | 65 |

Note:
The film strength (residual tensile strength) was measured as follows: 10 mm wide specimen strips were cut out of two groups of films, one of which had undergone PCT treatment (150° C., 5 atms, 100 hrs.). After the measurement of the thickness, the breaking strength of the specimen was measured using a tensile testing machine. (The rate of pulling: 5 mm/min; and the chuck distance: 50 mm). The residual tensile strength was calculated according to the following formula:
Residual film strength (%) = S'/S × 100
where S: strength of film which has not undergone PCT treatment
S': strength of film which has undergone PCT treatment

COMPARATIVE EXAMPLE 6

A 15 wt% solution of polyimide precursor was prepared by mixing two reaction products separately prepared by reacting bis(3-aminopropyl)tetramethyldisiloxane and pyromellitic dianhydride and by reacting 4,4'-diaminodiphenylether and pyromellitic dianhydride in the same ratios as in Comparative Example 1.

The polyimide precursor obtained from the diaminosiloxane had an inherent viscosity of 0.63. The polyimide precursor obtained from the silicon-free diamine had an inherent viscosity of 2.00. The mixture of It is noted from the above table that the films obtained in Examples 1 and 2, in which 3,3',4,4'-biphenyltetracarboxylic dianhydride was used as an aromatic tetracarboxylic dianhydride, are superior electrical properties (volume resistivity) at high in temperatures under high humidity and film strength to those obtained in Comparative Examples 1 to 3, in which other dianhydrides were used.

The polyimide film obtained in Comparative Example 4 has not poor electrical properties but has poor adhesion to silicon wafer. The polyimide films obtained in Comparative Examples 5 and 7 have a satisfactory adhesion but have poor electrical properties at high temperatures under high humidity. The volume resistivity of the polyimide film in Comparative Example 5 is about 1/100 of the polyimide film in Example 1.

The polyimide film obtained in Comparative Example 6, in which a mixture of silicon-free polyimide precursor and silicon-containing precursor was used, has poor adhesion and electrical properties at high temperatures under high humidity, although the content of silicon in the mixture is in the range specified in this invention.

EXAMPLE 3

Into a 500 ml flask equipped with a stirrer, cooling tube, thermometer, and nitrogen inlet, and placed on a water bath, were charged 148.71 g of N,N'-dimethylformamide which had been dried overnight with calcium hydride and distilled under nitrogen. Nitrogen was introduced into the flask. Then, using a 1 ml microsyringe, 0.87 g (0.0035 mole) of bis(3-aminopropyl)-tetramethyldisiloxane H$_2$N—(CH$_2$)$_3$Si—(CH$_3$)$_2$O—Si—(CH$_3$)$_2$(CH$_2$)$_3$NH$_2$ was charged. Subsequently, 19.3 g (0.0965 mole) of 4,4'-diaminodiphenylether was charged, with stirring. Finally, 29.4 g (0.1 mole) of 3,3',4,4'-biphenyltetracarboxylic dianhydride was added slowly. The reactants were stirred, while keeping the temperature of system at 30° C. or less, until a transparent viscous solution was obtained.

The 25 wt% solution of polyimide precursor thus obtained had a viscosity higher than 2,000,000 centipoises which is the upper limit measurable with a Brookfield viscometer at 25° C. The precursor had an inherent viscosity of 1.67 and contained 0.397 wt% of silicon.

The solution of the polyimide precursor thus prepared was then heat aged with stirring under a nitrogen stream at 55±5° C. on a water bath for 34 hours. As the result of heat aging, the polyimide precursor was depolymerized to such an extent that the inherent viscosity was 0.42 and the solution viscosity was 4,400 centipoises.

The solution containing this precursor was applied by spin coating to a silicon wafer, followed by air drying at 150° C. for 1 hour, at 200° C. for 1 hour, and at 250° C. for 6 hours. The polyimide film thus formed was examined by infrared absorption spectrometry. Absorption of >C=O based on the imide group was observed at 1,780 cm$^{-1}$ and 1,720 cm$^{-1}$. The spin coating was carried out by dropping 2 to 3 g of the precursor solution at 3,500 rpm.

COMPARATIVE EXAMPLE 8

A 25 wt% solution of polyimide precursor was prepared in the same manner as in Example 3 except that 125.91 g of purified N,N'-dimethylformamide was used and 21.8 g (0.1 mole) of pyromellitic dianhydride was used as an aromatic tetracarboxylic dianhydride.

The polyimide precursor thus obtained had an inherent viscosity of 1.65 and contained 0.469 wt% of silicon. The solution viscosity was higher than 2,000,000 centipoises.

This polyimide precursor was heat aged at 55±5° C. for 24 hours in the same manner as in Example 3, so as to decrease the molecular weight to such an extent that the inherent viscosity was 0.38 and the solution viscosity was 2,200 centipoises.

The solution of this precursor was applied by spin coating to a silicon wafer under the same conditions as in Example 3. The coating was heated in an air drier at 150° C. for 1 hour, at 200° C. for 1 hour, and at 300° C. for 1 hour to form a polyimide film. The resulting polyimide film was tough.

COMPARATIVE EXAMPLE 9

A 25 wt% solution of polyimide precursor was prepared in the same manner as in Example 3 except that 156.53 g of purified N,N'-dimethylformamide, 32.2 g (0.1 mole) of 3,3',4,4'-benzophenonetetracarboxylic dianhydride as an aromatic tetracarboxylic dianhydride, and 19.107 g (0.0965 mole) of 4,4'-diaminodiphenylmethane as a silicon-free diamine were used. The polyimide precursor thus obtained had an inherent viscosity of 1.38 and contained 0.377 wt% of silicon. The solution viscosity was 1,700,000 centipoises.

This polyimide precursor was heat aged at 55±5° C. for 15 hours in the same manner as in Example 3, so as to decrease the molecular weight to such an extent that the inherent viscosity was 0.45 and the solution viscosity was 2,300 centipoises.

The solution of this precursor was applied by spin coating to a silicon wafer under the same conditions as in Example 3. The tensile strength of the coated film decreased to 40% after 6 months, but the film was tough so as to be sufficiently used as a protecting film and insulating film.

COMPARATIVE EXAMPLE 10

A 25 wt% solution of polyimide precursor was prepared in the same manner as in Example 3 except that 148.27 g of purified N,N'-dimethylformamide, 19.9 g (0.0995 mole) of 4,4'-diaminodiphenylether, and 0.1243 g (0.0005 mole) of bis(3-aminopropyl)tetramethyldisiloxane were used. The polyimide precursor thus obtained had an inherent viscosity of 2.37 and contained 0.057 wt% of silicon. The solution viscosity was higher than 2,000,000 centipoises.

This polyimide precursor was heat aged in the same manner as in Example 3, so as to decrease the molecular weight to such an extent that the inherent viscosity was 0.41 and the solution viscosity was 2,700 centipoises.

The solution of this precursor was applied by spin coating to a silicon wafer under the same conditions as in Example 3 and a polyimide film was formed after heating.

COMPARATIVE EXAMPLE 11

A 25 wt% solution of polyimide precursor was prepared in the same manner as in Example 3 except that 149.22 g of purified N,N'-dimethylformamide, 18.6 g (0.093 mole) of 4,4'-diaminodiphenylether, and 1.7395 g (0.007 mole) of bis(3-aminopropyl)tetramethyldisiloxane were used. The polyimide precursor thus obtained had an inherent viscosity of 0.80 and contained 0.791 wt% of silicon. The solution viscosity was 50,000 centipoises.

This polyimide precursor was heat aged in the same manner as in Example 3, so as to decrease the molecular weight to such an extent that the inherent viscosity was 0.45 and the solution viscosity was 5,100 centipoises.

The solution of this precursor was applied by spin coating to a silicon wafer under the same conditions as in Example 3 and a polyimide film was formed after heating.

COMPARATIVE EXAMPLE 12

A 25 wt% solution of polyimide precursor was prepared by mixing two reaction products separately prepared by reacting bis(3-aminopropyl)tetramethyldisiloxane and pyromellitic dianhydride and by reacting 4,4'-diaminodiphenylether and pyromellitic dianhydride in the same ratios as in Comparative Example 8.

The polyimide precursor obtained from the diaminosiloxane had an inherent viscosity of 0.63. The polyimide precursor obtained from the silicon-free diamine had an inherent viscosity of 2.00. The mixture of the polyimide precursors contained 0.469 wt% of silicon. The solution viscosity was higher than 2,000,000 centipoises (the measurable upper limit).

This polyimide precursor was heat aged in the same manner as in Example 3, so as to decrease the molecular weight to such an extent that the inherent viscosity was 0.53 and the solution viscosity was 4,100 centipoises.

The solution of this precursor was applied by spin coating to a silicon wafer under the same conditions as in Comparative Example 8 and a polyimide film was formed after heating.

COMPARATIVE EXAMPLE 13

A 25 wt% solution of polyimide precursor was prepared in the same manner as in Example 3 except that 99.27 g of purified N,N'-dimethylformamide, 21.8 g (0.1 mole) of pyromellitic dianhydride as an aromatic tetracarboxylic dianhydride, 10.42 g (0.0965 mole) of p-phenylenediamine as a silicon-free diamine, and 0.87 g (0.0035 mole) of bis(3-aminopropyl)tetramethyldisiloxane as a diaminosiloxane were used.

The polyimide precursor thus obtained had an inherent viscosity of 1.58 and contained 0.594 wt% of silicon. The solution viscosity was 1,800,000 centipoises.

This polyimide precursor was heat aged in the same manner as in Example 3, so as to decrease the molecular weight to such an extent that the inherent viscosity was 0.39 and the solution viscosity was 1,900 centipoises.

The solution of this precursor was applied by spin coating to a silicon wafer under the same conditions as in Example 3 and a polyimide film was formed after heating.

The polyimide films obtained in Example 3 and Comparative Examples 8 to 13 were tested for adhesion and electrical insulating properties under the same environment. The polyimide film formed by spin coating was visually examined. The results are shown in the following table.

Incidentally, "B" in the table indicates the data obtained with the polyimide precursor which had undergone heat aging, and "A" in the table indicates the data obtained with the polyimide precursor which had not undergone heat aging but diluted to an extent that such can be coated.

|  | Coatability | Adhesion to Silicon Wafer | | Volume Resistivity 500 V (ohm · cm) | | Breakdown Voltage (kv/mm) | Film Strength (residual tensile strength) (%) |
| --- | --- | --- | --- | --- | --- | --- | --- |
|  |  | Normal Condition | PCT × 24 Hrs | Normal Condition | PCT × 24 Hrs |  |  |
| Example 3 A | Dewetting, uneven | Good | Good | $2.2 \times 10^{16}$ | $4.0 \times 10^{16}$ | 135 | 91 |
| Examples 3 B | Good | Good | Good | $2.1 \times 10^{16}$ | $1.7 \times 10^{16}$ | 128 | 91 |
| Comparative Example 8 A | Dewetting, uneven | Good | Good | $3.0 \times 10^{16}$ | $1.1 \times 10^{15}$ | 125 | 72 |
| Comparative Example 8 B | Good | Good | Good | $2.7 \times 10^{16}$ | $1.0 \times 10^{15}$ | 120 | 70 |
| Comparative Example 9 A | Dewetting, uneven | Good | Good | $2.1 \times 10^{16}$ | $3.4 \times 10^{15}$ | 135 | 35 |
| Comparative Example 9 B | Good | Good | Good | $4.0 \times 10^{16}$ | $1.3 \times 10^{15}$ | 125 | 31 |
| Comparative Example 10 | Good | Poor | Peel | $3.3 \times 10^{16}$ | $5.1 \times 10^{15}$ | 138 | 93 |
| Comparative Example 11 | Good | Good | Good | $1.0 \times 10^{16}$ | $1.1 \times 10^{13}$ | 70 | 87 |
| Comparative Example 12 | Good | Poor | Peel | $1.5 \times 10^{16}$ | $3.2 \times 10^{16}$ | 127 | 65 |
| Comparative Example 13 | Good | Good | Poor | $5.5 \times 10^{15}$ | $7.3 \times 10^{12}$ | 85 | 50 |

It is noted from the above table that the solution of siloxane-modified polyimide precursor which has undergone heat aging is easy to apply to silicon wafers and glass and provides a polyimide film free of cracks and pinholes. The polyimide film is also outstanding in adhesion, heat resistance, low stress, mechanical strength (film strength), and moisture resistance. Thus, the polyimide precursor contributes to the improvement of reliability of semiconductor elements.

It is also noted that the solution of siloxane-modified polyimide precursor which has undergone heat aging is inferior in coatability. The precursor produced from a small quantity of diaminosiloxane (Comparative Example 10) and the precursor produced from a large amount of diaminosiloxane (Comparative Examples 11 and 13) have poor adhesion and moisture resistance.

The polyimide film obtained in Comparative Example 12, in which a diaminosiloxane and silicon-free diamine are reacted separately with an aromatic tetracarboxylic dianhydride, has poor adhesion and moisture resistance.

As an additional example, the heat aging in Example 3 was carried out for 6 hours to give a siloxane-modified polyimide precursor having an inherent viscosity of 0.75 and a solution viscosity of 30,000 centipoises. This precursor was formed into a polyimide film as mentioned above. Some improvement was observed in the state of the film formed by spin coating, but the thickness of the film was uneven and the coatability was poor as compared with the one in Example 3.

As further example, the heat aging was carried out for 60 hours to give a siloxane-modified polyimide precursor having an inherent viscosity of 0.28 and a solution viscosity of 600 centipoises. This precursor was formed into a polyimide film as mentioned above. The resulting film had microcracks and had low breakdown voltage. The film did not function as a protecting film and insulating film for semiconductor elements.

While the invention has been described in detail and with reference to specific embodiments thereof, it will be apparent to one skilled in the art that various changes and modifications can be made therein without departing from the spirit and scope thereof.

What is claimed is:

1. A siloxane-modified polyimide precursor which can be converted into a polyimide having excellent adhesion and moisture resistance, the precursor being a reaction product prepared by simultaneously polymerizing (a) a diaminosiloxane represented by the formula

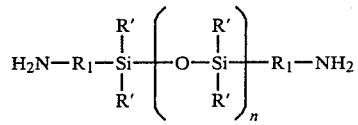

wherein $R_1$ is a divalent organic group, $R'$ is a monovalent organic group, and n is an integer of 1 to 1,000, and (b) a diamine containing no silicon atoms in its molecule with (c) 3,3',4,4'-biphenyltetracarboxylic dianhydride in an inert organic solvent, wherein the diaminosiloxane is used in an amount of 1 to 4 mole % per mole of the total diamino compounds and such that the silicon content in the reaction product is 0.5 wt. % or less, the precursor having the formula

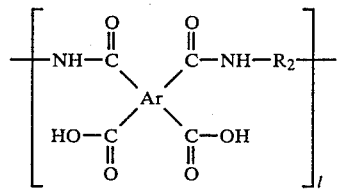

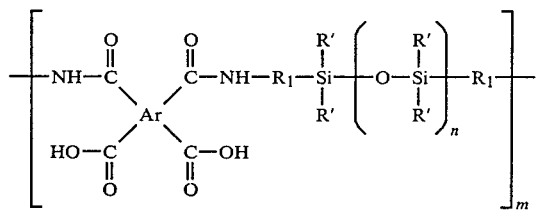

wherein $R_1$, $R'$ and n are the same as defined above; $R_2$ is a divalent organic group containing no silicon atoms; Ar is a tetravalent biphenyl organic group; and l and m are positive integers with the proviso that $m/l+m=0.01$ to 0.04.

2. The precursor as claimed in claim 1, wherein the polymerization is conducted at a temperature of 60° C. or less under the nitrogen gas stream.

3. The precursor as claimed in claim 1, wherein the diaminosiloxane is

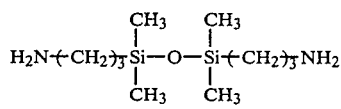

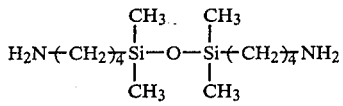

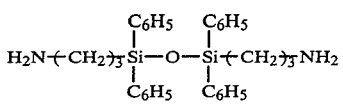

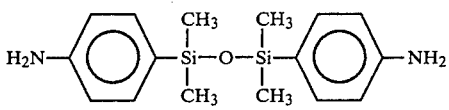

4. The precursor as claimed in claim 1, wherein the diaminosiloxane is

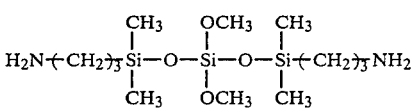

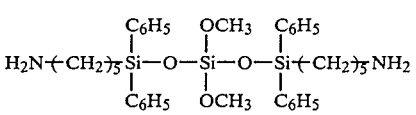

5. The precursor as claimed in claim 1, wherein the diamine containing no silicon atoms in the molecule is an aromatic diamine, an aliphatic diamine or an alicyclic diamine, represented by the formula $$H_2N—R_2—NH_2$$

wherein $R_2$ is a divalent organic group containing no silicon atoms.

6. The precursor as claimed in claim 5, wherein the diamine is selected from the group consisting of m-phenyleneamine, p-phenylenediamine, 4,4'-diaminodiphenylmethane, 4,4'-diaminodiphenylether, 2,2'-bis(4-aminophenyl)propane, 3,3'-diaminodiphenylsulfone, 4,4'-diaminodiphenylsulfone, 4,4'-diaminodiphenylsulfide, benzidine, benzidine-3,3'-dicarboxylic acid, benzidine-3,3'-disulfonic acid, 3,3'-dimethoxybenzidine, p-bis(4-aminophenoxy)benzene, m-bis(4-aminophenoxy)benzene, m-xylylene diamine, and p-xylylene diamine.

7. The precursor as claimed in claim 1, wherein the ratio of the diaminosiloxane plus diamine containing no silicon atoms to the 3,3',4,4'-biphenyltetracarboxylic dianhydride is equimolar.

8. The precursor as claimed in claim 1, wherein the precursor has an inherent viscosity of 1.3 to 3.0 as measured at 30° C. as a 0.5% solution in N-methyl-2-pyrolidone.

9. The precursor as claimed in claim 1, wherein the reaction product obtained by the polymerization is in solution in the organic solvent and the so obtained solution is heat aged at 40° to 80° C. to reduce the inherent viscosity of the polyimide precursor.

10. The precursor as claimed in claim 9, wherein the polyimide precursor before heat aging has the inherent viscosity of 1.3 to 3.0 as measured at 30° C. as a 0.5% solution of N-methyl-2-pyrolidene.

11. The precursor as claimed in claim 9, wherein the polyimide precursor after heat aging has the inherent viscosity of 0.3 to 0.7 as measured at 30° C. as a 0.5% solution in N-methyl-2-pyrolidone.

12. A coated article comprising a substrate and a polyimide coating on the substrate, the polyimide having excellent adhesion and moisture resistance and being formed as a reaction product by the steps of
(1) simultaneously polymerizing (a) a diaminosiloxane represented by the formula

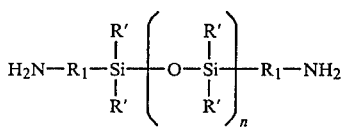

wherein $R_1$ is a divalent organic group, $R'$ is a monovalent organic group, and n is an integer of 1 to 1,000, and (b) a diamine containing no silicon atoms in its molecule, with (c) 3,3',4,4'-biphenyltetracarboxylic dianyhydride in an inert organic solvent, wherein the diaminosiloxane is used in an amount of 1 to 4 mole % per mole of the total diamino compounds and such that the silicon content in the reaction product is 0.5 wt % or less to form a polyimide precursor, and
(2) heating the precursor to dehydrate and cyclize it to obtain the polyimide, the polyimide having the formula

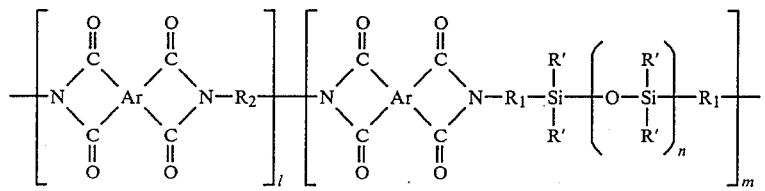

wherein $R_1$, $R'$ and n are the same as defined above; $R_2$ is a divalent organic group containing no silicon atoms; Ar is a tetravelent biphenyl organic group; and l and m are positive integers with the proviso that m/l+m=0.01 to 0.04.

13. The article as claimed in claim 12, wherein the polymerization is conducted at a temperature of 60° C. or less under the nitrogen gas stream.

14. The article as claimed in claim 12, wherein the diaminosiloxane is

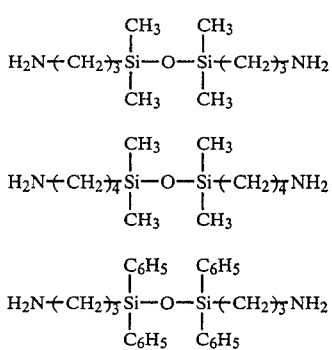

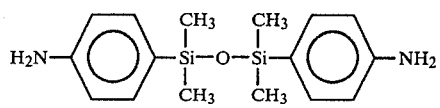

15. The article as claimed in claim 12, wherein the diaminosiloxane is

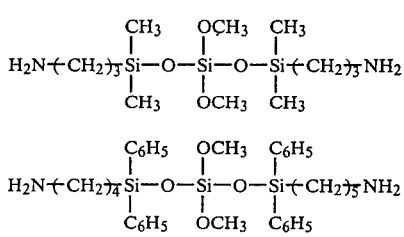

16. The article as claimed in claim 12, wherein the diamine containing no silicon atoms in the molecule is an aromatic diamine, an aliphatic diamine or an alicyclic diamine, represented by the formula

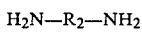

wherein $R_2$ is a divalent organic group containing no silicon atoms.

17. The article as claimed in claim 12, wherein the diamine is selected from the group consisting of m-phenylenediamine, p-phenylenediamine, 4,4'-diaminodiphenylmethane, 4,4'-diaminodiphenylether, 2,2'-bis(4-aminophenyl)propane, 3,3'-diaminodiphenylsulfone, 4,4'-diaminodiphenylsulfone, 4,4'-diaminodiphenylsulfide, benzidine-3-monosulfonic acid, 3,3'-dimethoxybenzidine, p-bis(4-aminophenoxy)benzene, m-bis(4-aminophenoxy)benzene, m-xylylene diamine, and p-xylylene diamine.

18. The article as claimed in claim 12, wherein the ratio of the diaminosiloxane plus diamine containing no silicon atoms to the 3,3',4,4'-biphenyltetracarboxylic dianhydride is equimolar.

19. The article as claimed in claim 12, wherein the reaction product obtained by the polymerization is in solution in the organic solvent, and the so-obtained solution is heat aged to reduce the inherent viscosity of the polyimide precursor before the precursor is subjected to the heating which dehydrates and cyclizes.

20. The article as claimed in claim 12, wherein the substrate is silicon or glass.

21. A polyimide having excellent adhesion and moisture resistance and being formed as a reaction product by the steps of
(1) simultaneously polymerizing (a) a diaminosiloxane represented by the formula

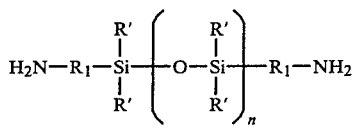

wherein $R_1$ is a divalent organic group, $R'$ is a monovalent organic group, and n is an integer of 1 to 1,000, and (b) a diamine containing no silicon atoms in its molecule, with (c) 3,3',4,4'-biphenyltetracarboxylic dianhydride in an inert organic solvent, wherein diaminosiloxane is used in an amount of 1 to 4 mole % per mole of the total diamino compounds and such that the silicon content in the reaction product is 0.5 wt % or less to form a polyimide precursor, and (2) heating the precursor to dehydrate and cyclize it to obtain the polyimide, the polyimide having the formula

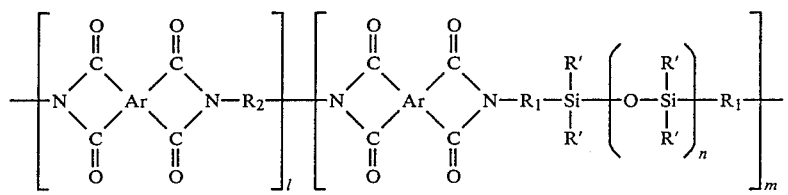

wherein $R_1$, $R'$ and n are the same as defined above; $R_2$ is a divalent organic group containing no silicon atoms; Ar is a tetravalent biphenyl organic group; and l and m are positive integers with the proviso that $m/l + m = 0.01$ to 0.04.

22. The polyimide as claimed in claim 21, wherein the polymerization is conducted at a temperature of 60° C. or less under the nitrogen gas stream.

23. The polyimide as claimed in claim 21, wherein the diaminosiloxane is

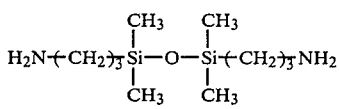

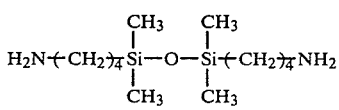

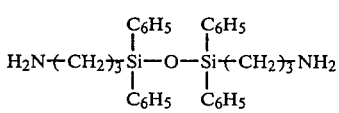

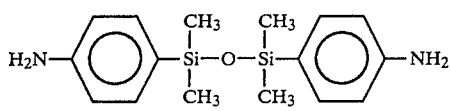

24. The polyimide as claimed in claim 21, wherein the diaminosiloxane is

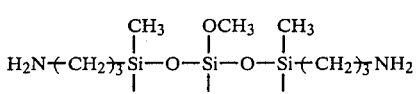

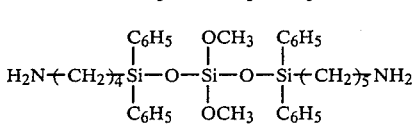

25. The polyimide as claimed in claim 21, wherein the diamine containing no silicon atoms in the molecule is an aromatic diamine, an aliphatic diamine or an alicyclic diamine, represented by the formula $H_2N-R_2-NH_2$ wherein $R_2$ is a divalent organic group containing no silicon atoms.

26. The polyimide as claimed in claim 21, wherein the diamine is selected from the group consisting of m-phenylenediamine, p-phenylenediamine, 4,4'-diaminodiphenylmethane, 4,4'-diaminodiphenylether, 2,2'-bis(4-aminophenyl)propane, 3,3'-diaminodiphenylsulfone, 4,4'-diaminophenylsulfone, 4,4'-diaminophenylsulfide, benzidine-3-monosulfonic acid, 3,3'-dimethoxybenzidine, p-bis(4-aminophenoxy)benzene, m-bis(4-aminophenoxy)benzene, m-xylylene diamine, and p-xylylene diamine.

27. The polyimide as claimed in claim 21, wherein the ratio of the diaminosiloxane plus diamine containing no silicon atoms to the 3,3',4,4'-biphenyltetracarboxylic dianhydride is equimolar.

28. The polyimide as claimed in claim 24, wherein the reaction product obtained by the polymerization is in solution in the organic solvent, and the so-obtained solution is heat aged to reduce the inherent viscosity of the polyimide percursor before the precursor is subjected to the heating which dehydrates and cyclizes.

* * * * *